United States Patent [19]

Corown et al.

[11] Patent Number: 5,044,208

[45] Date of Patent: Sep. 3, 1991

[54] DOUBLE-PIGTAIL-SHAPED, CORIOLIS-TYPE MASS FLOW RATE METER

[75] Inventors: Michael E. Corown; Randy L. Oliver, both of Greenwood, S.C.

[73] Assignee: Neptune Measurement Company, Greenwood, S.C.

[21] Appl. No.: 27,522

[22] Filed: Mar. 18, 1987

[51] Int. Cl.[5] ............................................... G01F 1/84
[52] U.S. Cl. ............................................. 73/861.38
[58] Field of Search ......................... 73/861.37, 861.38

[56] References Cited

U.S. PATENT DOCUMENTS

| | | | |
|---|---|---|---|
| 4,655,089 | 4/1987 | Kappelt et al. | 73/861.38 |
| 4,660,421 | 4/1987 | Dahlin et al. | 73/861.38 |
| 4,680,974 | 7/1987 | Simonsen | 73/861.38 |
| 4,716,771 | 1/1988 | Kane | 73/861.38 |
| 4,856,346 | 8/1989 | Kane | 73/861.38 |

OTHER PUBLICATIONS

K-Flow Bulletin, "Mass Flow Meters", 10/86.
K-Flow Design Perspective Report, 1/87.

Primary Examiner—Herbert Goldstein
Attorney, Agent, or Firm—Cooper & Dunham

[57] ABSTRACT

A Coriolis-type mass flow meter which uses two conduits wherein the inlet and outlet of each are coaxial with each other and with the respective oscillation axis. Each conduit comprises, in the direction of flow, an inlet J-shaped portion made up of a straight inlet and a first flow reversing bend, a C-shaped portion made up of a second flow reversing bend, a straight middle part and a third flow reversing bend, and an outlet-shaped portion made up of a fourth flow reversing bend and a straight outlet. In side elevation the first and fourth bends are within the space defined by the C-shaped portion.

42 Claims, 6 Drawing Sheets

DOUBLE-PIGTAIL-SHAPED, CORIOLIS-TYPE MASS FLOW RATE METER

BACKGROUND AND SUMMARY OF THE INVENTION

The invention is in the field of flow meters, more particularly mass flow meters of the Coriolis type.

Coriolis-type meters are based on the physical principle of conservation of angular momentum as it applies to the Coriolis acceleration of a fluid flowing through a conduit. For example, as illustrated in Sipin U.S. Pat. No. 3,485,098, when fluid flows through a bent tube which is mechanically oscillated about an axis passing through the inlet and outlet ends of the tube, Coriolis forces are generated causing the tube to twist about a response axis. Mass flow rate can be deduced from measuring this twist.

In Coriolis-type meters an electromagnetic oscillator can drive the tube about its oscillation axis at the system's resonant frequency, thereby producing a Coriolis acceleration and a resulting force. The force acts perpendicular to the flow path and in alternate opposite directions as between the two legs of the tube, superimposing an oscillating moment about the response axis on the motion about the oscillation axis. The resulting moment, acting about the response axis and in a plane perpendicular to the driving moment, produces twisting at a deflection angle which is approximately proportional to the mass flow rate for a constant angular velocity. Control over variations in angular velocity can be attempted by a detection scheme which senses the deflection angle near the central position of the tube excursions, i.e. where the angular acceleration of the tube is near zero, at the point of constant angular velocity. The tube can be oscillated relative to a leaf spring of a similar mass, to make use of a convenient resonant frequency, or relative to a parallel tube carrying the same or shared fluid flow.

Figure 4:
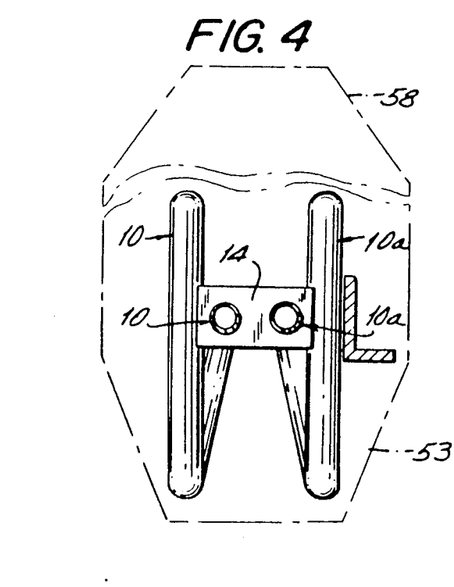
FIG. 4 is a section taken along lines 4—4 of FIG. 2.
Figure 5:
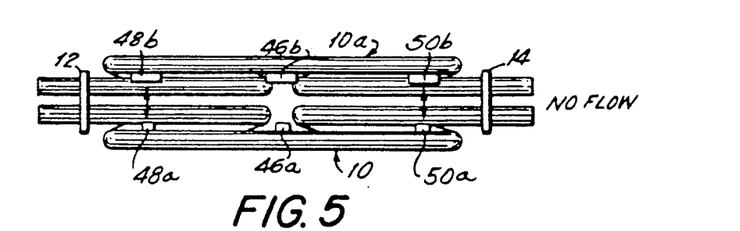
FIG. 5 is a top plan illustrating two double-pigtail-shaped conduits oscillating with no fluid flow through them.

Certain tube shapes have been proposed in the past. For example said Sipin U.S. Pat. No. 3,485,098 shows a tube having a U-shaped operative portion while Sipin U.S. Pat. No. 4,559,833 illustrates an S-shaped conduit. Smith U.S. Pat. Re. 31,450 illustrates a U-shaped tube supported at its inlet and outlet ends and oscillated relative to a leaf spring about an axis perpendicular the legs at the support points. In addition, said patent Re. 31,450 and Cox et al. U.S. Pat. No. 4,127,028 illustrate a tube shape which also is U-shaped but its legs are closer to each other at their inlet and outlet ends than at the curve of the U. Still in addition, said Cox et al. patent illustrates in FIGS. 4 and 5 a generally 0-shaped tube having an inlet and an outlet which in FIG. 4 are approximately radial, and in FIG. 5 are approximately tangential (but the tube is not in a single plane). Two U-shaped, or generally U-shaped, tubes carrying the same or shared flow are illustrated in said Cox et al. patent and in Smith et al. U.S. Pat. No. 4,491,025.

Various techniques have been proposed for deducing mass flow rate from measurements of the effect of Coriolis forces on the tube or tubes. For example, said Sipin U.S. Pat. No. 3,485,098 discusses using strain gauges or magnetic vibration velocity sensors to derive electrical signals related to the motion of the vibrated tube, noting in connection with velocity sensors that their differential output is proportional to mass flow rate. Said Smith U.S. Pat. Re. 31,450 states that while there may be worthwhile information obtained by measurements as in said Sipin U.S. Pat. No. 3,485,098, velocity sensors require measurement of a minute differential velocity superimposed on the very large pipe oscillation velocity. Patent Re. 31,450 therefor forsakes the use of velocity sensors in favor of optical sensors (photo-interrupters) which have a flag (an opaque plate) affixed to the oscillated tube and a photocell and a light source affixed to a stationary frame such that the sensor would detect the passage of a tube leg through a plane fixed in space but would not detect any other aspect of the tube movement. The time lag between the respective passage of each leg of the tube through a respective plane fixed in space, is proposed as a measure of mass flow rate. A later Smith et al. U.S. Pat. No. 4,442,338 proposes the use of velocity sensors (despite the comments on such sensors in Re. 31,450) or strain gauges, or acceleration sensors. It proposes squaring the sinusoidal outputs of the velocity sensors to obtain the exact same square waves as in said earlier patent Re. 31,450, and deducing mass flow rate in the same manner.

Additional examples of material concerning mass flow meters can be found in Young, A. M., "Coriolis-Based Mass Flow Measurement," Sensors, Dec. 1985, Vol. 2 No. 12, pp. 6-10; "Mass Flow Meters," Measurements & Control, Sept. 1985, pp. 295-302; Spitzer, D. W., "Mass Flowmeters," Industrial Flow Measurement, IRP Student Text, Section 12, pp. 133-141; Hickl, E. L. et al., "Mass Flow Measurement In The 80's," pp. 49-52; "Mass Flow Meters," Section 13, pp. 141-157; "Mass Flowmeter Accurate To±0.15%," Chemical Engineering, Dec. 10, 1984; "Flowmeter Installs Directly In-Line With Process Piping," Chemical Processing, Mid-Nov. 1984, p. 82, DeCarlo, J. P., "Mass-Flow Measurement," Fundamentals Of Flow Measurement, 1984, Unit 11, pp. 203-220; Plache, K. O., "Coriolis/Gyroscopic Flow Meter," Mechanical Engineering, March 1979, pp. 36-41.

It is believed that a substantial need still remains to suppress undesirable characteristics of the known Coriolis-type mass flow rate meters and enhance desirable characteristics, and this invention is directed to meeting that need.

In one exemplary embodiment, a mass flow rate meter in accordance with the invention uses a pair of conduits which have a complex shape referred to in this specification as "double-pigtail", and deduces mass flow rate from changes in the phase difference of signals derived from velocity sensors responsive to relative motion between the sides of the two moving conduits.

A meter embodying this example of the invention brings about significant and surprising advantages in accuracy, ease of manufacture and use, and other desirable characteristics as compared with known prior proposals such as the use of U-shaped tube and time lag measurements of the passage of the sides of a U-shaped tube through planes fixed in space, as proposed in said U.S. Pat. Re. 31,450. For example, other things being equal, this example of the invention has a lesser dimension in the direction transverse to the general direction of the incoming and outgoing flow. This can be important in practice because a common application of Coriolis-type meters is in a continuous process, and plant pipe systems tend to be more cramped by parallel pipes in the general direction of process flow, but it is usually convenient to replace a section of pipe by a meter having the dimensions and configuration of a meter shaped as described in this application. Another significant advantage is in the type of loading at the points where the inlet and outlet ends of each meter conduit are affixed to supports. Each meter conduit typically is welded to one or more fixed supports at its inlet and outlet ends. These welds can be a weak point. In the driving mode a U-shaped conduit stresses the joint weld in bending stress while a meter shaped as described in this application stresses this joint in torsion, which is less likely to cause joint failure. In the response mode, a U-shaped meter stresses the weld joint in torsion while a meter shaped as described in this application stresses that joint in bending. However, in the response mode the bending stress on the weld joints of a meter shaped as described in this application is lower because while in the U-shaped conduit the twisting of the curve of the U is transmitted directly to the weld joint by the straight or substantially straight legs, in a meter shaped as described in this application this twisting is transmitted through continuously and smoothly curved portions which themselves twist and thus substantially reduce the bending load at the weld joints. In addition, the movement of the conduits in the response mode in this system is small as compared to the movement in the drive mode, resulting in a much reduced bending load at the weld joints as compared with a U-shaped meter. Still in addition, the response/drive natural frequency of vibration ratio in a meter embodying an example of the invention herein can be about 1:1.6, which is considerably lower than in a U-shaped meter. This lower response/drive natural frequency ratio brings about other advantages: (i) there is more phase shift for a given mass flow rate and (ii) twisting is easier about the torsional response axis. Still in addition, in a meter using the shape described herein the conduit is continuously and smoothly curved, to reduce flow resistance and disturbance. For example, the bend radius of a conduit in a meter embodying an example of the invention preferably is about, and no less than, 2 to 3 times the outside diameter of the conduit, thus assuring low resistance to flow, and low pressure drop across the meter. The use of such a bend radius in this system further helps reduce pressure drop as compared with a U-shaped conduit, in which the bend radius is considerably larger, and hence more tubing is used to make the bend. In addition, it has been found that the shape of the conduit in a double-pigtail-shaped meter inherently increases sensitivity as compared with known U-shape designs; this means that for a given level of sensitivity a double-pigtail-shape meter can use larger diameter conduits, and thus can have less flow resistance and less pressure drop. The advantages of the double-pigtail-shaped meter as opposed to prior proposals such as for an S-shaped meter include, among other things, (i) the fact that the inlet and outlet sections are coaxial, which is desirable when the meter is used in a facility where it is spliced in a straight pipe, and (ii) that a double-pigtail-shaped meter can more effectively eliminate any adverse effect of gas bubbles which may form in a liquid flow, and of liquid (such as a condensate) which may form in a gas flow. The advantages over prior proposals such as the use of generally O-shaped tubes include the fact that if the inlet and outlet are approximately radial, as in FIG. 4 of said Cox et al. U.S. Pat. No. 4,127,028, the joint weld and flow resistance and disturbance problems are similar to those discussed in connection with U-shaped tubes, and if the inlet and outlet are as in FIG. 5 of the same Cox et al. patent, there is greater asymmetry with respect to a plane normal to the oscillation axis and bisecting the conduit, which could introduce extraneous vibrational modes. Other significant and surprising advantages will become apparent from the detailed disclosure below of an exemplary double-pigtail-shaped meter.

In an exemplary embodiment of the invention, two generally double-pigtail-shaped conduits share the flow, typically equally. Usually, they are positioned with the inlet and outlets substantially horizontal. Each conduit has a large, generally C-shaped central portion. When at rest, these C-shaped portions conform to two respective substantially parallel vertical planes, and are aligned with each other in all views. The ends of the C-shaped portion merge into respective J-shaped, offset portions which are between the two C-shaped portions in plan and in front and back elevation, and partly within the C-shape in side elevation, with the free ends of the offset portions extending laterally out of the respective C-shaped portions in side elevation. These free ends of the two conduits are braced to each other just outside the C-shaped portions in side elevation. The J-shaped, offset portion at the inlet end of the C-shaped portion comprises a substantially straight inlet merging into a first flow reversing bend. In the flow direction this is followed by a second flow reversing bend, which is a part of the C-shaped portion, by a substantially straight middle part of the C-shaped portion, by a third flow reversing bend which also is a part of the C-shaped portion, and by the offset portion at the outlet side of the C-shaped portion, which comprises a fourth flow reversing bend and a substantially straight outlet. All flow reversing bends in a conduit curve in the same sense (i.e. all curve clockwise or all curve counterclockwise, depending on the side elevation chosen for the view), and the flow in the two conduits is in the same direction, and typically is shared substantially equally.

A driver alternately pushes apart and pulls together the centers (in side elevation) of the C-shaped portions of the conduits at a driving frequency which corresponds to the natural vibration frequency of the system, to thereby oscillate each conduit about a respective oscillation axis which is substantially concentric with the inlet and outlet of that conduit. If there is no fluid flow through the conduits, their substantially straight middle parts tend to remain substantially parallel despite their driving mode oscillation. If there is fluid flow through them, the resulting Coriolis forces twist each conduit about a respective response axis which is perpendicular to its oscillation axis and its substantially straight middle part, superimposing this twisting motion on the driving mode oscillation. The conduits twist about their respective response axes out of phase with each other, i.e. while their second bends (e.g. the left sides of the C-shaped portions) move toward each other their third bends (the right sides of the C-shaped portions) move away from each other, and while their second bends move away from each other their third bends move toward each other. Sensors at the second and third bends of the conduits produce sensor signals related to the relative movement of the second and third bends of the conduits toward and away from each other. The parameter of interest is the change in phase difference between the sensor signal for the second bends and the sensor signal for the third bends. Mass flow rate is deduced from this change in phase difference.

DETAILED DESCRIPTION

Figure 1:
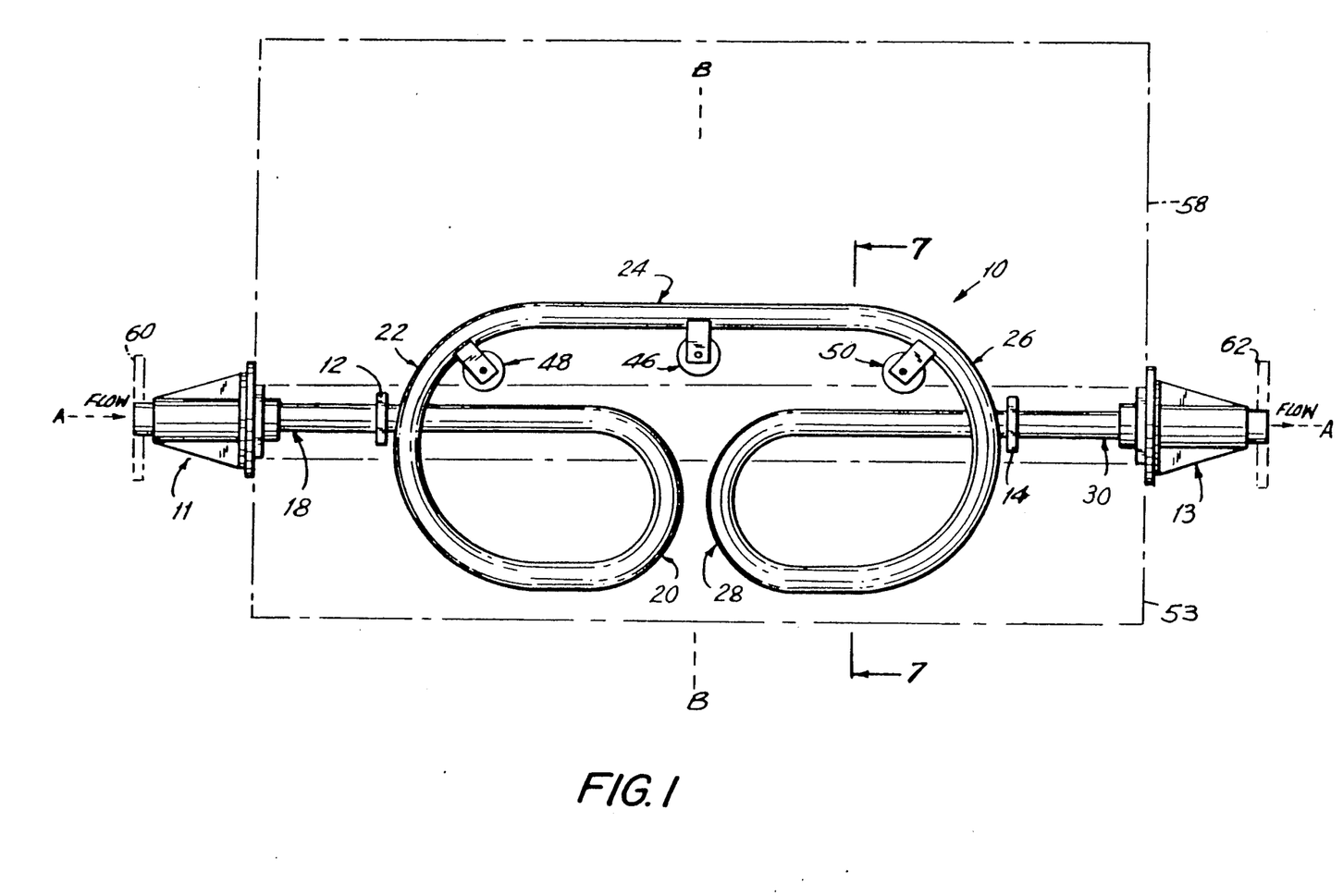
FIG. 1 is a side elevation of an double-pigtail-shaped conduit and inlet and outlet manifolds, and of a schematic outline of a meter enclosure.

FIG. 1 illustrates a generally double-pigtail-shaped conduit 10 which is a part of a mass flow rate meter embodying an example of the invention. Conduit 10 is affixed, as by weld joints, to an inlet manifold 11 at the left side in the side elevation of FIG. 1, and to an outlet manifold 13 at the right side. The flow comes from the left and exits to the right in this example. As better seen in FIG. 2, there are two such conduits, 10 and 10a, whose central, C-shaped portion substantially conform, when at rest, to two planes which are parallel to each other and to the plane of FIG. 1 and are perpendicular to the plane of FIG. 2. The two conduits are substantially identical to each other; each part of 10a which corresponds to a part of 10 bears the same reference numeral but with the suffix "a." Conduits 10 and 10a are also affixed to an inlet brace 12 and an outlet brace 14, as by weld joints. Braces 12 and 14 are inboard of manifolds 11 and 13 and outboard of the C-shaped portions of the conduits, and each can be a metal plate with openings for the conduits. Manifold 11 divides the incoming flow into a part going into conduit 10 and a substantially equal part going into conduit 10a, and manifold 13 combines the flow from conduit 10 and that from conduit 10a into a single outgoing flow leaving the meter. Each manifold can be a casting. Each conduit is continuous, made from a single piece of bent tubing, and curves continuously, to minimize flow resistance and disturbance.

In use of the meter, manifolds 11 and 13 typically are fixedly secured to respective supports, and act as supports for conduits 10 and 10a. These manifolds (supports) 11 and 13 face each other and are spaced from each other along an axis A'A' which, as discussed in greater detail below, is parallel to the respective oscillation axes about which the conduits are driven to oscillate at the system's natural frequency of vibration. The conduits thus are in the form of restrained beams extending between these supports (manifolds) 11 and 13. Braces 12 and 14, which are inboard from supports 11 and 13, also face each other and are spaced from each other along the oscillation axis AA.

As best seen in FIG. 1, conduit 10 is generally double-pigtail-shaped and comprises, in the flow direction: (1) an inlet J-shaped portion comprising a substantially straight inlet 18 affixed to inlet support (or manifold) 11 and merging into a first flow reversing bend 20, (2) a C-shaped portion comprising a second flow reversing bend 22, a substantially straight middle part 24 and a third flow reversing bend 26, and (3) an outlet J-shaped portion which comprises a fourth flow reversing bend 28 and a substantially straight outlet 30. Fluid comes into the meter through an inlet flange 60 at the outboard end of manifold 11, and exits the meter through a flange 62 at the outboard end of manifold 13. Conduit 10a has corresponding portions, substantially identical to those of conduit 10.

Figures 1A, 1B:
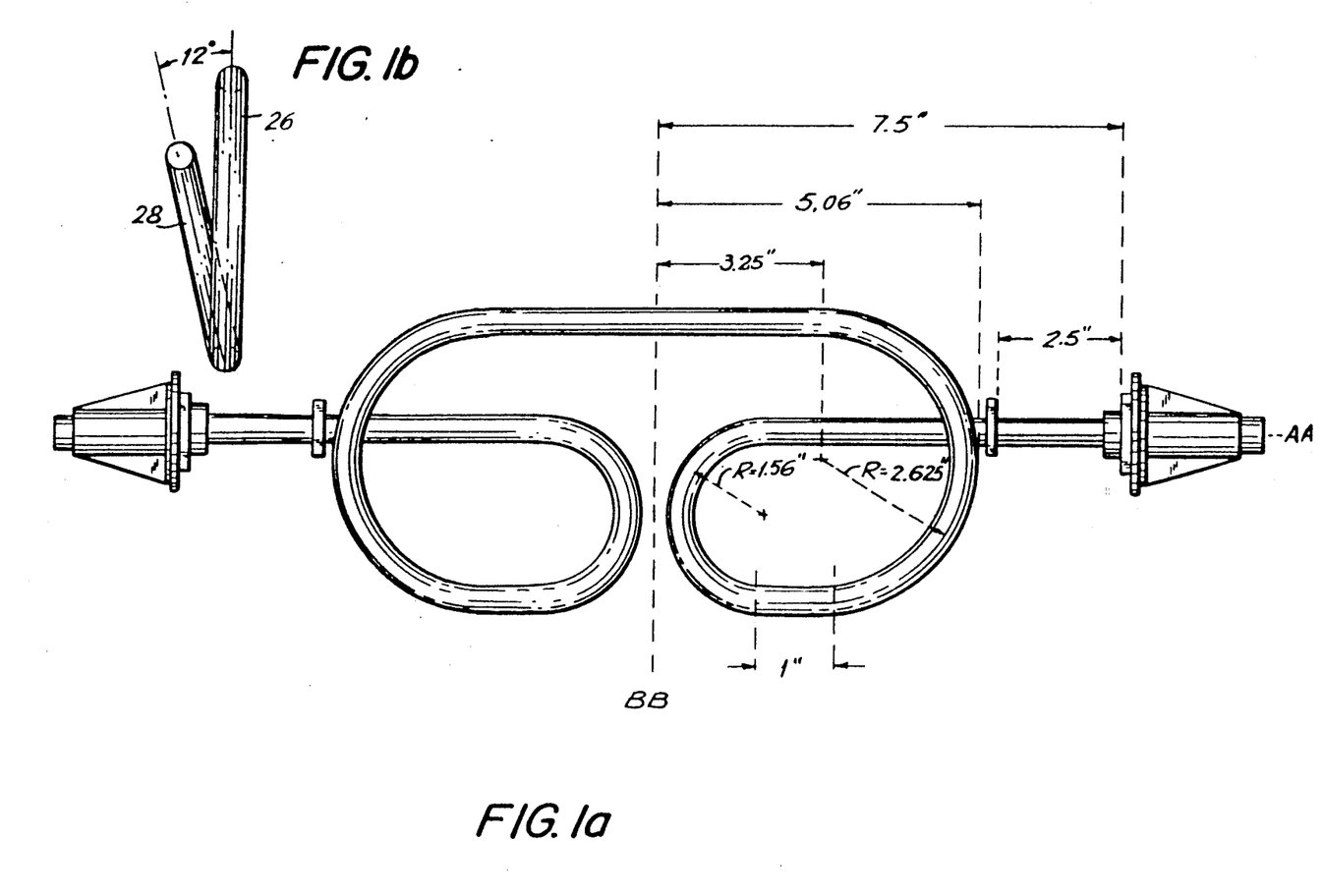
FIG. 1a shows the conduit of FIG. 1 with exemplary dimensions.
FIG. 1b is a front elevation of the conduit of FIG. 1, without the manifolds.

As seen in FIGS. 1a and 1b, in one example of the invention, for 0.5" OD conduit 10 inlet 18 is about 6" long, first bend 20 has a radius of about 1.56" (measured to the center axis of the conduit) and is preceded and succeeded by a straight portion about 1" long, second bend 22 has a radius of about 2.625" (again measured to the center axis of the conduit), and the middle part 24 is about 6.125" long. The conduit is symmetrical with respect to its response axis BB. In front elevation, the angle between the central axes of bends 22 and 20 (and 26 and 28) is about 12°. These dimensions are substantially the same for the corresponding parts of conduit 10a. In this exemplary embodiment the resonant frequency of the oscillating system in the driving mode is about 90 Hz and the resonant frequency of the twisting system in the response mode is about 140-145 Hz, giving a response/drive ratio of resonant frequencies of about 1.6. Ratios in the range from out 1.4 to about 1.8 are preferred for this system. It should be noted that the ratios are between the resonant frequencies, i.e. the natural frequencies of vibration of the conduits, in the respective modes. In actual use, the system oscillates in the drive mode about the respective oscillation axes at a given frequency and the twist about the response axes in the response mode is at the same frequency. Note also that the above frequencies and ratios are specified for empty conduits (filled with air at atmospheric pressure), and that the mass of the material flowing through the conduits changes the system's resonant frequencies.

An electromagnetic driver 46, of a type known in the art, alternately pushes apart and pulls together the centers of the middle parts 24 and 24a of conduits 10 and 10a, at a driving frequency corresponding to the natural frequency of vibration of the system, to thereby oscillate each conduit about a respective oscillation axis AA which is substantially concentric with its inlet 18 or 18a and outlet 30 or 30a. Note that neither oscillation axis AA intersects its conduit at or near the points where it is affixed to supports 11 and 13, or to braces 12 and 14, and that neither oscillation axis is perpendicular to its conduit's inlet and/or outlet at or near the points where they are affixed to supports 11 and 13, or to braces 12 and 14. Note also that each oscillation axis AA is perpendicular to supports 11 and 13 and to braces 12 and 14; it is not parallel to any of them. As each conduit is in the form of a restrained beam supported at its ends at supports 11 and 13 and braced at 12 and 14, neither is a cantilevered conduit or a conduit which is in the form of a cantilevered beam.

If there is no fluid flow through conduits 10 and 10a, their substantially straight middle parts 24 and 24a tend to remain parallel to each other while moving away from and toward each other in the course of the driving mode oscillation. However, if there is fluid flow through conduits 10 and 10a, the resulting Coriolis forces superimpose (on the driving mode oscillation of each) a twisting motion about the respective response axis BB. Each response axis BB is substantially perpendicular to its conduit's oscillation axis AA and substantially bisects its conduit's middle part 24 (or 24a). The relative motion of conduits 10 and 10a with respect to each other generates respective signals in sensors 48 and 50, which can be velocity sensors such as voice coils of the type known in the art.

Figure 2:
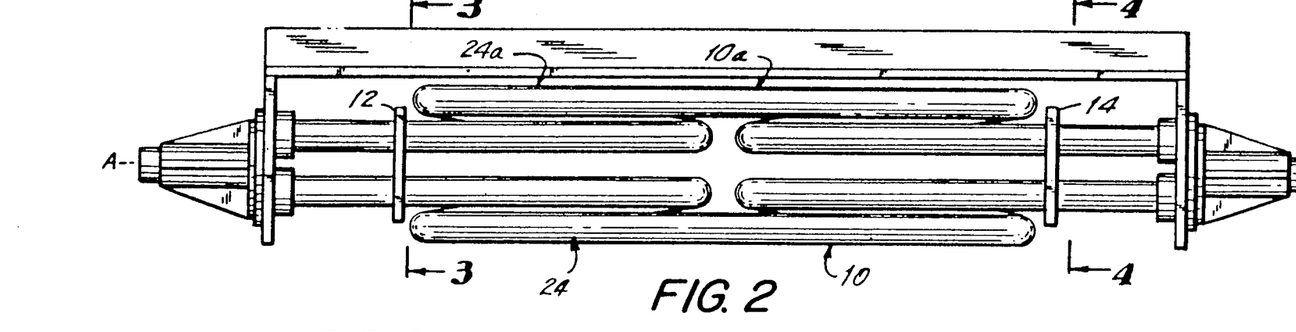
FIG. 2 is a top plan a mass flow meter using double-pigtail-shaped conduits, with the meter enclosure partly open and transducers omitted for clarity.
Figure 3:
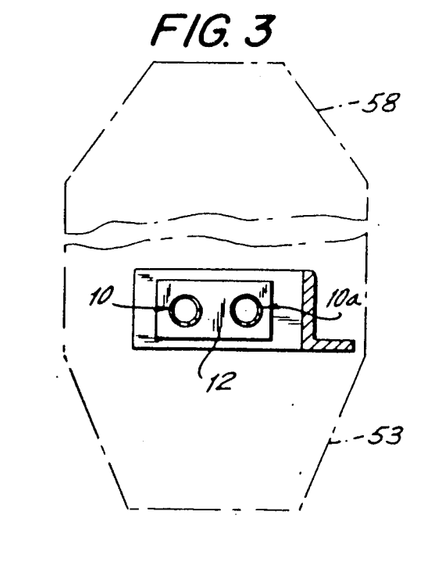
FIG. 3 is a section taken along lines 3—3 of FIG. 2.

For clarity, driver 46 and sensors 48 and 50 are not shown in FIGS. 1a, 1b and 2. Also for clarity, portions 48a nd 48b of sensor 48, and portions 50a and 50b of sensor 50, are shown spaced from each other in FIGS. 5 and 6, although in fact the two portions of each sensor remain at all times in telescoping engagement with each other, as is known in the art and as is illustrated in FIG. 7 for the two portions of sensor 50.

FIG. 5 illustrates conduits 10 and 10a moving in the driving mode when there is no fluid flow through them. As indicated, their middle parts 24 and 24a remain substantially parallel to each other while moving toward and away from each other due to the forces generated by driver 46, which can comprise a magnet 46a affixed to the middle portion of conduit 10 and a coil 46b affixed at a matching position to the middle section of conduit 10a. The coil can be energized with an AC signal corresponding to the system's natural vibration frequency, as is known in the art.

Figure 6:
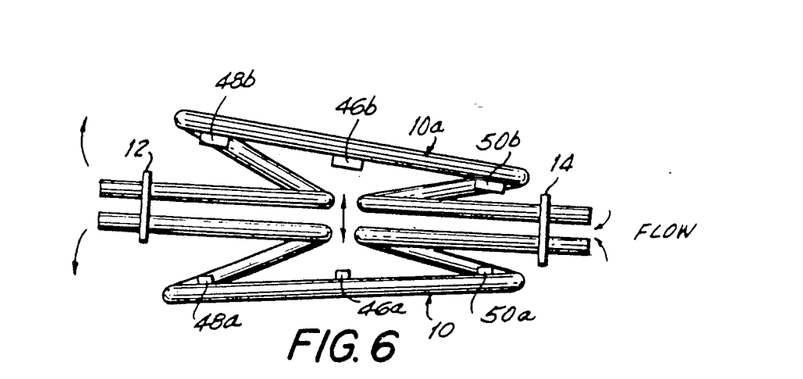
FIG. 6 is the same view but with fluid flow.

FIG. 6 illustrates conduits 10 and 10a undergoing a twisting motion (due to fluid flow through them) superimposed on their driving mode oscillation. As indicated, in a particular stage of their relative motion their left sides (second bends 22 and 22a) are moving away from each other while their right sides (third bends 26 and 26a) are moving toward each other. Sensor 48 generates a signal related to the relative motion of the left sides of the conduits, and sensor 50 generates a signal related to the relative motion of the right sides of the conduits. The maximum twist angle should occur when the distance between the centers of the two conduits is approximately as at rest. The twist due to Coriolis forces changes the rate at which the sides of the conduits (where the sensors are) come toward or move away from each other. For clarity, the twisting movement has been exaggerated; in fact the movement about the response axes typically is less than illustrated in FIG. 6.

Figure 7:
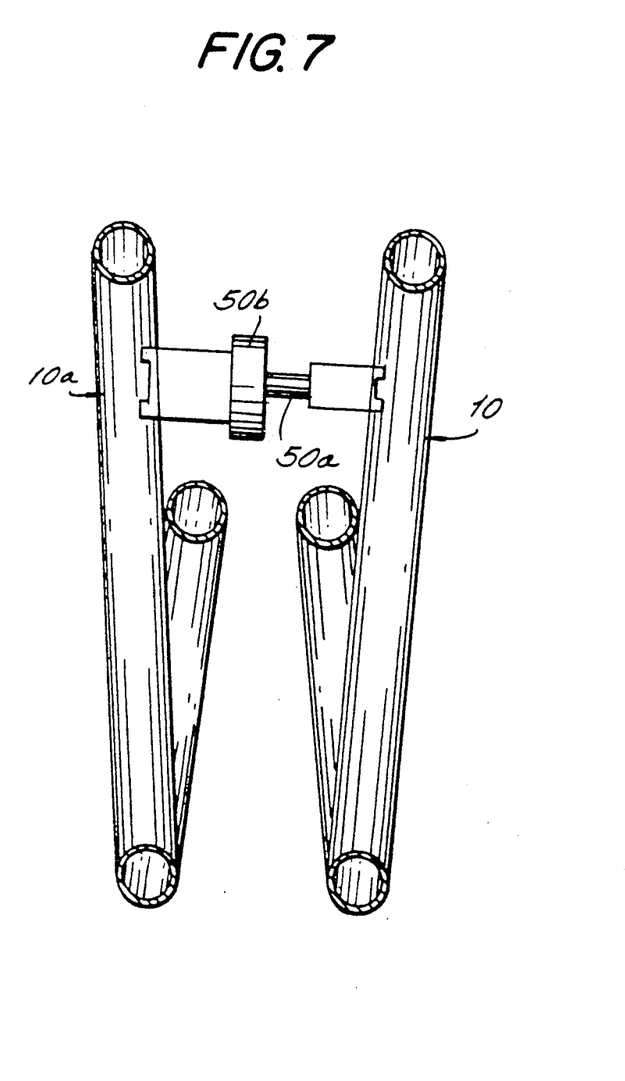
FIG. 7 is a section taken along lines 7—7 in FIG. 1, illustrating an exemplary transducer.

As illustrated schematically in FIGS. 5 and 6, and in more detail in FIG. 7, each sensor can be a voice coil of a known type, comprising a magnet 50a affixed to conduit 10 and moving relative to coil 50b to induce therein a sensor signal related to the relative motion of the two conduits. The other sensor, 48, can be similar. As earlier noted, for clarity the sensors in FIGS. 5 and 6 are shown with their respective portions separated from each other, although in fact they telescope, as seen in FIG. 7, i.e., the magnetic material rod (48a, 50a) is at all times within the annular coil (48b, 50b).

For a given conduit, in the driving mode the inlet 18 and outlet 30 are loaded in torsion about the oscillation axis AA for that conduit in the same angular direction. As between the two conduits, the inlets are loaded in torsion in opposite angular directions about the respective oscillation axes AA, and so are the outlets. Because of the configuration described above, the cross products of the velocity of the fluid flowing in each of conduits 10 and 10a and the rotation of each conduit about its respective oscillation axis AA produce a Coriolis acceleration. This Coriolis acceleration multiplied by the mass of the fluid flowing through the conduits results in an alternating Coriolis force acting on each conduit. These Coriolis forces produce distortions which result in a difference in the relative velocities of the two conduits at the second bends 22 and 22a, as well as at the third bends 26 and 26a. The shape of the conduits allows significantly greater torsional deformation due to Coriolis forces than obtained in conduits where the Coriolis forces are generated mainly in two straight sections of a conduit. This increases the sensitivity of the meter and the accuracy of measurements.

For required strength and stability, manifolds 11 and 13 are mounted fixedly to a tray 52 which is sufficiently rigid to keep extraneous loads from affecting conduits 10 and 10a. Braces 54 and 56 can be welded to tray 52 as shown in FIGS. 1-4 to stiffen it. Conduits 10 and 10a, and braces 12 and 14 do not contact tray 52. For protection and improved appearance, tray 52 and conduits 10 and 10a and braces 12 and 14 (and internal electronics such as discussed in connection with FIG. 8) are enclosed in a housing having a lower portion schematically illustrated at 53 in FIGS. 1, 3 and 4, and an upper portion 58 seen in the same FIGS. Housing portions 53 and 58 are fixedly secured to manifolds 11 and 13, and do not contact conduits 10 and 10a or tray 52. Flanges 60 and 62 at the outboard ends of supports (manifolds) 11 and 13 are used to splice the meter in a pipe (not shown) delivering the incoming flow and carrying away the outgoing flow as is known in the art.

Figure 8:
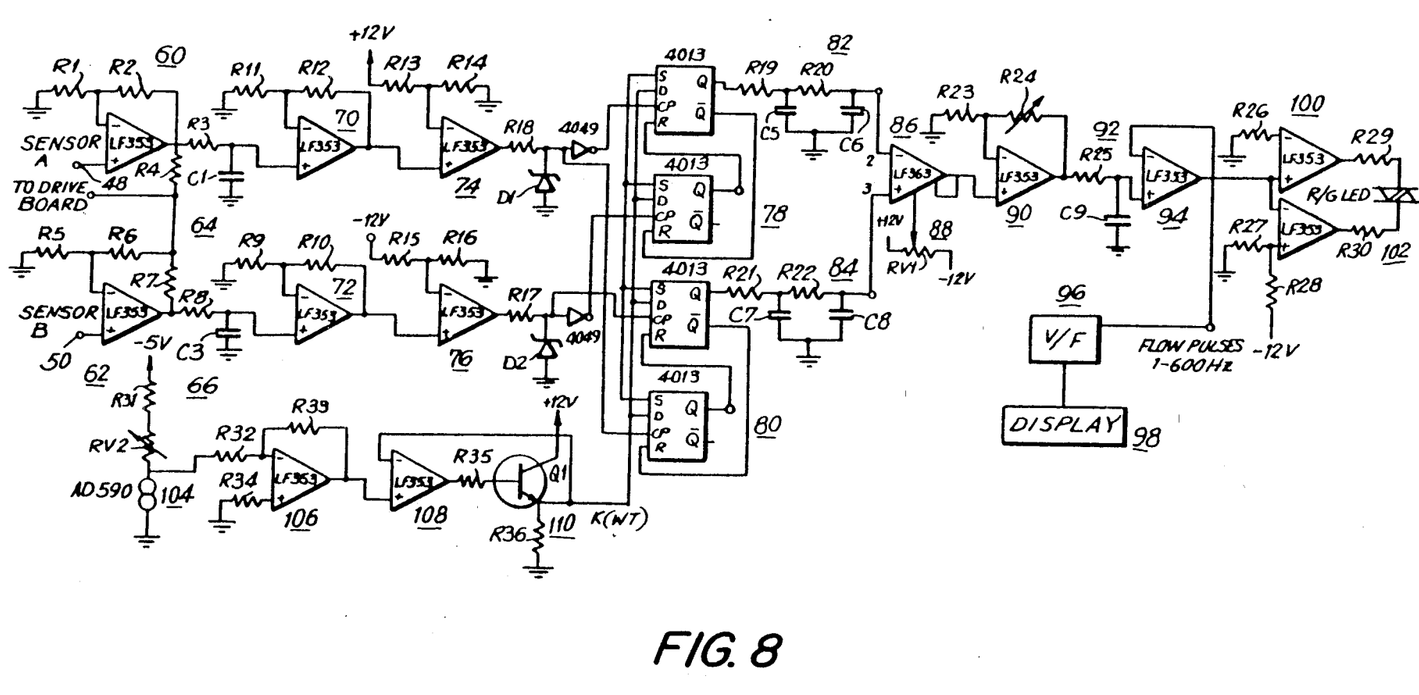
FIG. 8 is a schematic diagram illustrating a circuit used to deduce mass flow rate.
Figure 9:
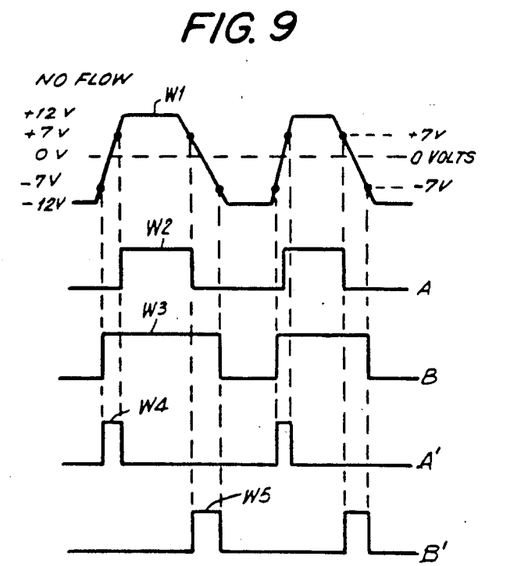
FIG. 9 is a timing diagram of signals present in the circuit of FIG. 8 when no fluid flows through the conduits.
Figure 10:
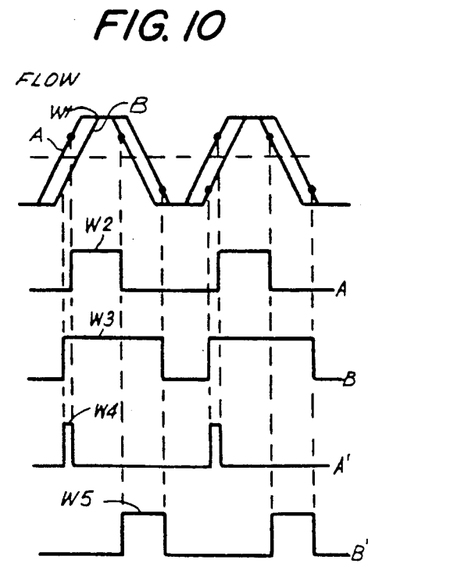
FIG. 10 is a timing diagram of signals present in the circuit of FIG. 8 when fluid flows through the conduits.

Referring to FIGS. 8-10 for an illustration of a technique for deducing mass flow rate through conduits 10 and 10a from the outputs of sensors 48 and 50, the output of each sensor when the conduits are oscillated (with or without flow) is an AC waveform substantially at the driving frequency, which in turn corresponds to the system's natural frequency of vibration. The output of sensor 48 is fed into input A of an amplifier stage 60, and the output of sensor 50 is fed into input B of a similar amplifier stage 62. Each of stages 60 and 62 can comprise an operational amplifier in the configuration illustrated in FIG. 8, and can provide a gain of about 50 but can be provided with an output level limiter to raise the sensor outputs in peak-to-peak level from about 0.7 volts to about 24 volts. The outputs of amplifier stages 60 and 62 are filtered at respective filter stages 64 and 66, which drops their peak-to-peak level to about 0.23-0.24 volts, and a gain of about 100 is added at respective amplifier stages 70 and 72, to raise the peak-to-peak voltages to about 24 volts. The outputs of amplifier stages 70 and 72 are waveforms of the general truncated triangular shape illustrated at W1 in FIG. 9. At comparator stages 74 and 76 the respective processed outputs of sensors 48 and 50 (signals A and B, respectively) are squared, using a 12 volt reference voltage dropped to about 7 volts by the illustrated voltage divider network. Note that comparator 74 uses a positive reference voltage while comparator 76 uses a negative reference voltage. The effect of this is illustrated in FIG. 9, which shows at W1 the outputs of amplifier stages 70 and 72. These outputs should be in phase, and should coincide. Any phase offset between them can be zeroed out as described below in connection with FIG. 11.

Comparator 74 uses the +7 volt nominal reference, and outputs a waveform such as W2 in FIG. 9, while comparator 76 uses the −7 volt nominal reference, and outputs a waveform such as W3. A flip-flop trigger network 78 in effect subtracts waveform W2 from waveform W3, allowing an output only when waveform W2 rises, to thereby produce as an output a waveform W4. A similar flip-flop trigger network 80 similarly produces a waveform W5, allowing an output only when waveform W1 falls. Waveforms W4 and W5 are filtered by respective RC networks 82 and 84, to convert them to DC levels for output at pins 2 and 3, respectively.

These DC outputs are input at pins 2 and 3, respectively, of a differential amplifier stage 86 provided with a zero adjustable resistor-reference voltage network 88 as illustrated. The output of zero adjust amplifier stage 86 goes into a span adjust amplifier stage 90, which has an adjustable gain and whose output is filtered to reduce ripple at RC stage 92, and the filtered output is buffered at stage 94, whose output goes to a voltage-to-frequency converter 96 which drives a display 98 displaying mass flow rate in suitable engineering units, such as in lb/sec or in any other desired units. A twin amplifier stage 100 connected as shown feeds a red/green light 102 used in a zero-adjust procedure. If the two sensors outputs are in phase when there is no flow, the outputs of amplifiers 100 should be balanced and light 102 should be off. If one or the other is higher, the amplifier outputs are not balanced, and balance can be restored by adjusting zero adjust resistor network 88.

As seen in FIGS. 8 and 9, when there is no flow and there is a proper zero adjust, the waveforms W4 and W5 should have the same duty cycle and hence the same DC level, and display 98 should receive a signal indicating no flow. When fluid flows through conduits 10 and 10a, the phase difference between waveforms A and B (and W2 and W3) changes, as illustrated in FIG. 10. Now the duty cycle of waveforms W4 and W5 is no longer the same, and their DC levels differ from each other. This change in phase difference is proportional to mass flow rate through conduits 10 and 10a. Differential amplifier stage 86 measures this phase difference and outputs a proportional DC level. Hence, display 98 should receive a signal indicative of a mass flow rate as determined by the sensor signals processed as discussed by the circuits illustrated in FIG. 8. If the fluid flow through the conduits is in the correct direction, and the electrical leads have been connected properly, light 102 should be green at this time.

The illustrated circuit components can have the following values:

| | | |
|---|---|---|
| R1 = 10 Kohm | R13 = 15 Kohm | R25 = 200 Kohm |
| R2 = 470 Kohm | R14 = 20 Kohm | R26 = 47 Kohm |
| R3 = 100 Kohm | R15 = 15 Kohm | R27 = 1.5 Kohm |
| R4 = 47 Kohm | R16 = 20 Kohm | R28 = 4.7 Kohm |
| R5 = 10 Kohm | R17 = 10 Kohm | R29 = 1 Kohm |
| R6 = 470 Kohm | R18 = 10 Kohm | R30 = 1 Kohm |
| R7 = 47 Kohm | R19 = 200 Kohm | R31 = 1.5 Kohm |
| R8 = 100 Kohm | R20 = 200 Kohm | R32 = 200 Kohm |
| R9 = 10 Kohm | R21 = 200 Kohm | R33 = 150 Kohm |
| R10 = 1 Kohm | R22 = 200 Kohm | R34 = 100 Kohm |
| R11 = 10 Kohm | R23 = 10 Kohm | R35 = 390 Kohm |
| R12 = 1 Kohm | R24 = 100 Kohm | R36 = 1.5 Kohm |
| C1 = .47 uF | | RV1 = 1 Kohm |
| C3 = .47 uF | | RV2 = 1 Kohm |
| C5 = 1.0 uf | | |
| C6 = 1.0 uF | | |
| C7 = 1.0 uF | | |
| C8 = 1.0 uF | | |
| C9 = 1.0 uf | | |

A temperature sensor 104 (FIG. 8) is coupled with one or both conduits to measure the conduit temperature. The resulting signal is amplified as shown at 106 and 108, and drives transistor 110 whose output is supplied as indicated to networks 78 and 80 to compensate for changes in conduit stiffness with temperature variations.

The exemplary dimensions for the 0.5 inch OD tube discussed above can be scaled to other sizes, for example in accordance with this scale factor:

$$[2.299(D_o^4 - D_i^4)/(D_o^2 - D_i^2)]^{\frac{1}{4}}$$

where $D_o$ and $D_i$ are, respectively, outside and inside diameter of the new conduit and this scale factor is used to scale the dimensions given for the old, 0.5 inch OD, 0.035 inch wall thickness, steel conduit shown in FIG. 1a.

We claim:

1. A Coriolis-type mass flow meter comprising:
   a pair of double-pigtail-shaped, continuous and continuously curved conduits for fluid flow, wherein each conduit comprises, in sequence in side elevation, along the direction of fluid flow therethrough, a substantially straight inlet and a first flow reversing bend which together form an inlet J-shaped portion, a second flow reversing bend and a middle part and a third flow reversing bend which together form a C-shaped portion, and a fourth flow reversing bend and a substantially straight outlet which together form an outlet J-shaped portion, and wherein when at rest, the middle parts of the conduits substantially conform to two parallel planes and are aligned with each other in side elevation;
   an inlet support supporting the inlets of the two conduits and an outlet support supporting the outlets of the two conduits, wherein said supports are located outside the outlines of said C-shaped portions in side elevation and support the conduits as restrained beams;
   a driver secured to the middle parts of the conduits to alternately push the middle parts of the conduits apart and pull them together at a driving frequency to thereby oscillate each conduit about a respective oscillation axis which is substantially coaxial with the inlet and outlet thereof;
   sensors secured to the second and third bends of the conduits to produce outputs related to the relative movement between the conduits about respective response axes each of which is substantially perpendicular to the respective conduit's oscillation axis and substantially bisects the respective conduit's middle part; and
   a circuit responsive to changes in phase difference between the sensor outputs to produce a signal indicative of mass flow rate through the conduits.

2. A meter as in claim 1 in which the entire C-shaped portions of the two conduits when at rest substantially conform to said parallel planes and are spaced from each other, and the first and fourth bends of each conduit in front elevation are at an angle to said planes and said inlets and outlets are located between said planes.

3. A meter as in claim 2 in which said angle is about 12°.

4. A meter as in claim 3 in which the radius of each bend is no less than about twice the conduit diameter.

5. A meter as in claim 3 in which the radius of each bend is no less than about three times the conduit diameter.

6. A meter as in claim 1 in which the radius of each bend is no less than about three times the conduit diameter.

7. A meter as in claim 1 in which the radius of each bend is no less than about twice the conduit diameter.

8. A meter comprising:
   a pair of continuous conduits each having an inlet and an outlet separated from each other by at least four flow reversing bends which are in the same angular direction;
   a driver which oscillates the conduits relative to each other about respective oscillation axes; and
   a circuit responsive to the relative response of the conduits about respective response axes in the presence of flow through the conduits and of oscillation thereof about the respective oscillation axes to provide an indication of the mass flow rate of said flow.

9. A meter as in claim 8 in which the inlet and outlet of each conduit are substantially straight and coaxial.

10. A meter as in claim 9 in which the inlet and outlet of each conduit are substantially coaxial with the conduit's oscillation axis.

11. A meter as in claim 10 including an inlet support to which the inlets are secured and an outlet support to which the outlets are secured, and wherein all of said bends are between the supports.

12. A meter as in claim 11 including an inlet brace to which the inlets are secured and an outlet brace to which the outlets are secured, and wherein the inlet brace is between the inlet support and the bends and the outlet brace is between the outlet support and the bends.

13. A meter as in claim 8 in which the inlet and outlet of each conduit are substantially coaxial with the conduit's oscillation axis.

14. A meter as in claim 13 including an inlet support to which the inlets are secured and an outlet support to which the outlets are secured, and wherein all of said bends are between the supports.

15. A meter as in claim 14 including an inlet brace to which the inlets are secured and an outlet brace to which the outlets are secured, and wherein the inlet brace is between the inlet support and the bends and the outlet brace is between the outlet support and the bends.

16. A meter as in claim 8 including an inlet support to which the inlets are secured and an outlet support to which the outlets are secured, and wherein all of said bends are between the supports.

17. A meter as in claim 16 including an inlet brace to which the inlets are secured and an outlet brace to which the outlets are secured, and wherein the inlet brace is between the inlet support and the bends and the outlet brace is between the outlet support and the bends.

18. A meter as in claim 8 including an inlet brace to which the inlets are secured and an outlet brace to which the outlets are secured, and wherein all of said bends are between the braces.

19. A meter as in claim 8 in which fluid enters each conduit at an entry located at one side of all bends and exits at an exit point located at an opposite side of all bends.

20. A meter comprising:
   an inlet support and an outlet support which faces said inlet support and is spaced therefrom;
   a first conduit and a second conduit, where each conduit has an inlet rigidly secured to the inlet support and an outlet rigidly secured to the outlet support, and each conduit thereby is supported as a restrained beam extending between said supports, wherein the inlets of said conduits are parallel to each other and the outlets of said conduits also are parallel to each other;
   wherein each conduit has at least two successive flow reversing bends which are between its inlet and outlet and are in the same angular direction, and wherein each conduit has a central portion which is spaced from the central portion of the other conduit by a spacing greater than that between the inlets of the two conduits and that between the outlets of the two conduits and wherein matching central portions of the two conduits substantially conform to a first plane, the inlets and outlets of said conduits substantially conform to a second plane, and portions of said conduits which are between said central portions and said inlets and outlets substantially conform to a third plane, and said first, second and third planes are parallel to each other; and
   a driver moving the conduits in the presence of fluid flow therethrough and a circuit responsive to the motion of said conduits to measure said flow.

21. A meter as in claim 20 in which said driver oscillates said conduits relative to each other about respective oscillation axes and said circuit is responsive to twisting of the conduits about respective response axes in the presence of flow through the conduits and of relative oscillation of the conduits about the respective response axes to provide an indication of the mass flow rate of said flow.

22. A meter as in claim 21 in which said bends are between said supports and are spaced from said supports toward said central portions of said conduits.

23. A meter as in claim 22 in which each of said conduits has at least four flow reversing bends which are in the same angular direction.

24. A meter as in claim 23 in which the respective oscillation axis of each of said conduits is coaxial with the inlet and outlet of the conduit.

25. A meter as in claim 24 in which the respective response axis of each conduit is generally in a plane which is substantially perpendicular to the oscillation axis of the conduit and substantially bisects the conduit.

26. A meter as in claim 20 in which each conduit has a respective oscillation axis which is coaxial with the conduit's inlet and outlet.

27. A meter as in claim 26 in which each of said conduits has a respective response axis about which it responds in the presence of flow through the conduit and in the presence of oscillation of the conduit about its oscillation axis, and said circuit is responsive to the relative response of the conduits about their respective response axes to provide an indication of the mass flow rate of said flow.

28. A meter comprising:
   a first continuous conduit which has an inlet and an outlet and a middle portion which is offset to one side only from an oscillation axis and is transverse to a response axis, and which conduit has at least two successive flow reversing bends which are in the same angular direction;

said conduit having a middle portion which is at one side of a plane which includes the inlet and outlet axes and having two intermediate portions which are between said middle portion and said inlet and outlet and are at the other side of said plane, wherein said plane is approximately equidistant from said middle portion and from said intermediate portions;

respective supports at which said inlet and outlet are mounted to be coaxial at said supports;

a second body;

a drive which oscillates the conduit about the oscillation axis relative to the second body to cause the conduit to respond about the response axis in the presence of a fluid flows through the conduit; and a circuit responsive to said response to provide an indication of the mass flow rate of said flow.

29. A meter as in claim 28 in which the second body comprises a second conduit which is substantially the same as the first conduit and has respective oscillation and response axes which are substantially parallel to the first circuit's oscillation and response axes, respectively, wherein the drive oscillates the conduits relative to each other about their respective oscillation axes, and wherein the circuit is responsive to the relative response of the two conduits about their respective response axes in the presence of flow shared between the conduits to provide an indication of the mass flow rate or said shared flow.

30. A meter as in claim 29 in which each of said conduits is round and the radius of each bend is at least about twice the conduit diameter.

31. A meter as in claim 28 in which said continuous conduit is round and the radius of each bend is at least about twice the conduit diameter.

32. A meter as in claim 31 in which said continuous conduit oscillates about the oscillation axis in a drive mode and responds about the response axis in a response mode, and the ratio of resonant frequencies of the conduit as between the response and drive modes is in the range of about 1.4 to about 1.8.

33. A meter as in claim 32 in which said supports include an inlet support to which the inlet is secured and outlet support to which the outlet is secured, wherein said bends are between the supports, and said second body is a second conduit which is substantially the same as the first conduit and including an inlet brace to which the conduit inlets are secured and an outlet brace to which the conduit outlets are secured, wherein said bends are between the braces and said braces are between the supports.

34. A meter as in claim 32 in which said supports include an inlet support to which the inlet is secured and an outlet support to which the outlet is secured, wherein said bends are between the supports and are spaced therefrom in the direction of the axes of said inlet and outlet.

35. A meter as in claim 28 in which said continuous conduit oscillates about the oscillation axis in a drive mode and responds about the response axis in a response mode, and the ratio of resonant frequencies between the response and drive modes is in the range of about 1.4 to about 1.8.

36. A meter as in claim 28 including an inlet brace to which the continuous conduit inlet and the second body are secured and an outlet brace to which the conduit outlet and said second body are secured, wherein said bends are between the braces.

37. A meter comprising:

a first continuous conduit which has an inlet and an outlet and a middle portion which is offset to one side only from an oscillation axis and is transverse to a response axis, and which conduit has at least two successive flow reversing bends which are in the same angular direction;

respective supports at which said inlet and outlet are mounted to be coaxial at said supports;

a second body;

a drive which oscillates the conduit about the oscillation axis relative to the second body to cause the conduit to respond about the response axis in the presence of a fluid flows through the conduit;

a circuit responsive to said response to provide an indication of the mass flow rate of said flow in which the second body comprises a second conduit which is substantially the same as the first conduit and has respective oscillation and response axes which are substantially parallel to the first circuit's oscillation and response axes, respectively, the drive oscillates the conduits relative to each other about their respective oscillation axes, and the circuit is responsive to the relative response of the two conduits about their respective response axes in the presence of flow shared between the conduits to provide an indication of the mass flow rate or said shared flow;

in which the conduits are round and the radius of each bend is at least about twice the conduit diameter; and in which the ratio of resonant frequency of the conduits about their respective response axes and the resonant frequency of the conduits about their respective oscillation axes is in the range of about 1.4 to about 1.8.

38. A meter as in claim 37 wherein said supports include an inlet support to which the inlets of said conduits are secured and an outlet support to which the outlets of said conduits are secured, wherein said bends are between the supports.

39. A meter comprising:

first conduit having, in side elevation and in the direction of flow therethrough, an inlet J-shaped portion, a C-shaped section and an outlet J-shaped section;

a drive which oscillates the conduit about an oscillation axis; and a circuit responsive to twisting of the C-shaped portion about a response axis in the presence of flow therethrough and of said oscillation thereof to provide an indication of the mass flow rate of said flow.

40. A meter as in claim 39 including a second conduit which is substantially the same as the first and has respective oscillation and response axes and shares the flow with the first conduit, wherein the drive oscillates the conduits with respect to each other about their respective oscillation axis and the conduits respond about their respective response axis in opposite angular directions.

41. A meter as in claim 39 including an inlet support to which the conduit inlet is joined by a rigid inlet joint and an outlet support which is spaced from and faces the inlet support and to which the conduit outlet is joined by a rigid outlet joint, wherein said joints are loaded in torsion due to the oscillation of the conduit about the oscillation axis and in bending due to the response of the conduit about the response axis.

42. A meter as in claim 39 in which in side elevation the C-shaped portion crosses the inlet and outlet J-shaped portions, the C-shaped portion has two flow reversing bends and the J-shaped portions each have one flow reversing bend, and the bends of the J-shaped portions are between the bends of the C-shaped portion.

* * * * *